United States Patent [19]

Camlibel et al.

[11] 4,240,717
[45] Dec. 23, 1980

[54] ELECTRODEPOSITION DISPLAY DEVICE

[75] Inventors: Irfan Camlibel, Stirling; Shobha Singh, Summit; LeGrand G. Van Uitert, Morristown; George J. Zydzik, Columbia, all of N.J.

[73] Assignee: Bell Telephone Laboratories, Incorporated, Murray Hill, N.J.

[21] Appl. No.: 972,706

[22] Filed: Dec. 26, 1978

[51] Int. Cl.³ .............................................. G02F 1/29
[52] U.S. Cl. ............................................ 350/363
[58] Field of Search ....................................... 350/363

[56] References Cited
PUBLICATIONS

"Inert Electrode Behavior of Tin Oxide-Coated Glass on Repeated Plating-Deplating Gelingin Concentrated NaI-AgI Solutions", by Mantell et al., J. Electrochemical Soc. vol. 109, pp. 992-993, (1962).
L'Afficheur Electrolytique Remplacant des Crisfaux Liquides", by Della-Mussia, translated by DeLaRue; *Mesures-Regulation-Automatisme*; pp. 43-44; (May 1977).

*Primary Examiner*—William L. Sikes
*Assistant Examiner*—León Scott, Jr.
*Attorney, Agent, or Firm*—Walter G. Nilsen

[57] ABSTRACT

An electrodeposition display device is described which uses an electrolyte containing silver species and certain anion species including iodide bromide or chloride. The electrolyte also contains a substituted ammonium halide such as tetrabutyl ammonium iodide. Such display devices have high contrast, large viewing angle and rapid redissolution of the display.

26 Claims, 1 Drawing Figure

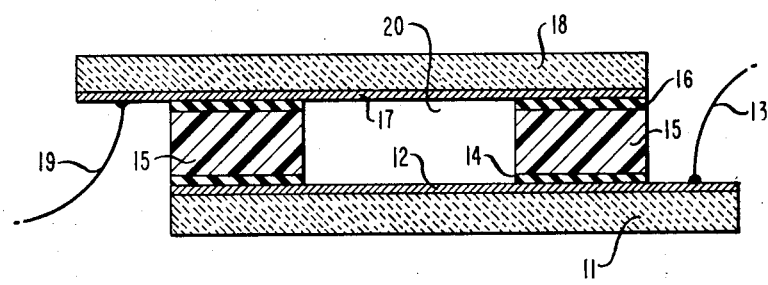

ELECTRODEPOSITION DISPLAY DEVICE

TECHNICAL FIELD

The invention is a display device which operates by electroplating material on a transparent conducting surface.

BACKGROUND OF THE INVENTION

Recent interest in display systems has been extensive principally because of the development of various integrated circuit devices such as calculators, watches, microprocessors, etc. These devices and other similar devices process or store information which often requires rapid and frequent reading. Particularly desirable in such display systems are low power consumption, good visibility (high contrast and large viewing angle) and low cost. Various systems are useful in display devices including ferroelectric ceramics, liquid crystals and various electric systems, such as electrochemichromic systems. Other display systems include plasma discharge panels and light emitting diodes. Although these systems may be satisfactory for some applications, the need remains for more versatile display systems with lower power consumption, better visibility and lower cost. Display devices may also be used as light modulators as described in a reference by J. Mantel and S. Zaromb, *Journal of the Electrochemical Society*, 109 (1962) pages 992-993. A display system of interest has been described by J. P. Della Mussia, *Mesures-Regulation-Automatisme* (France), Vol. 42, No. 5, May 1977, pages 43-44. This reference describes an alternate method of making a display system using a silver plating solution.

SUMMARY OF THE INVENTION

The invention is a versatile electrodeposition display system in which the active electrolyte contains, in addition to silver and/or iodide, bromide or chloride ions (e.g., added in the form of silver iodide, bromide or chloride), a quantity of quaternary ammonium or related halide. Iodide, bromide or chloride or mixtures thereof may be used. Use of quaternary ammonium and related salts makes for a finer deposit for the display which is easier to redissolve when a suitable electric field is applied. This results in faster display devices and permits use of higher concentrations of silver species and iodide or bromide species without accumulating undesirable heavy precipitate particles which persist as dark spots. Higher concentrations of silver and iodide or bromide species lower the power requirements for the device and reduce heat dissipation problems. Also, lower power requirements increase device reliability and lifetimes because of reduced generation of free iodine and reduced electrochemical decomposition of solvent.

Mixtures of tetra-alkyl ammonium iodide and ammonium iodide (or corresponding halides) are useful where, for example, compromise is desired between dark display and fast resolution of the precipitate. Indeed, for many applications, a mixture of a quaternary ammonium salt and an ammonium salt is preferred.

BRIEF DESCRIPTION OF THE DRAWING

The FIGURE shows a sectioned side view of an electrodeposition display device made in accordance with the invention.

DETAILED DESCRIPTION

In its broadest aspects, the invention is an electrodeposition display device in which the active material (generally a paste) from which the substance is electrodeposited contains an organic solvent, a silver containing substance at least partially dissolved in the organic solvent and an ammonium halide in which at least one carbon containing group is attached to the ammonium ion. Particular attention is paid to quaternary ammonium iodides, as their use leads to faster display-changing rates and finer-grain displays. Mixtures of quaternary ammonium iodide and ammonium iodide, for example, may be used to optimize display changing rates and high-contrast.

The invention employs substituted ammonium halides in the electrolyte, which are reasonably soluble in the organic solvent used. Further, the substituted ammonium halide should not give up protons easily. Considering the formula for a substituted ammonium iodide ($R_4N^+I^-$ in which each R may be different), it is required that at least one R group have at least one carbon atom and that all the R groups have twenty or less carbon atoms and that none of the substituents on the R groups give up protons easily. For example, aliphatic and aromatic substituents are useful as well as aliphatic and aromatic substituents with halide, ketone, ether, etc., functional groups. Quaternary ammonium iodide salts involving nitrogen heterocyclic compounds are also useful.

Because of high solubility, best results are obtained with 3 to 8 carbon atoms per substituent group (R group) in the formula $R_4N^+I^-$. Within this highly preferred group, the compounds tetrabutyl ammonium iodide and tetrahexyl ammonium iodide are preferred because of easy availability and low cost. Mixtures of compounds may be used as well as mixtures of quaternary salts with ammonium iodide.

A large variety of solvents are useful in the display device. Preference is given to solvents that are highly stable to the chemical and physical conditions present in the display device. In particular, it should not decompose under the influence of the voltages used in the device nor react destructively with the other ingredients in the display device. It should provide good solubility for silver-anion complexes (i.e., $Ag_3I_4^-$, $Ag_4I_5^-$, $Ag_2I_3^-$, $AgI_6^{-5}$, $AgBr_2^-$, $AgCl_2^-$, etc.) and preferably have a large liquid range above and below room temperature (preferably melting point less than $-40$ C. and boiling point greater than 120 C.).

Good solubility for the complexes mentioned above is particularly advantageous because material plates out at a lower voltage. This permits faster operation, with lower power consumption and much greater contrast in the display.

The solvent should not easily give up protons (it should exhibit a very low concentration of protons) so as to prevent deterioration of contacts by reducing protons to elemental hydrogen. Proton concentrations should be in the order of magnitude less than moderately basic water. It is preferred that the pKa value should be greater than 9 and more preferably greater than 12.

Typical solvents are dimethyl and diethyl sulfoxide, N,N-dimethyl and N,N-diethyl formamide, diethyl malonate, ethyl acetoacetic ester, ketones, esters, ethers and alcohols with high pKa values. Also useful are organic carbonates such as propylene carbonate, organic lactones, organic nitriles, nitrohydrocarbons, etc.

The solvents dimethylsulfoxide and N,N-dimethyl formamide are preferred because of high solubility for the silver-anion complexes and stability. One of these solvents (dimethylsulfoxide) has the disadvantage of a high melting point, namely 18 C. but the advantage of great solubility for silver-anion complex. This solvent is preferred only when the temperature of operation does not fall below 18 C. Mixed solvents may be used (i.e., a mixture of dimethylsulfoxide and N,N-dimethyl formamide) to obtain the advantage of high solubility and extend the temperature range of operation by lowering the melting point.

In addition to solvent, the electrolyte should contain silver compound. A variety of silver compounds may be used, provided they yield solutions of silver-containing ions. Generally, it is most convenient to use silver iodide or silver bromide. Silver containing iodides such as $RbAg_4I_5$, $NH_4Ag_4I_5$, and similar compounds may also be used. The corresponding bromides are also useful.

Either iodide, bromide or chloride may be used as the anion. These ions may be introduced in the form of iodide, bromide or chloride salts, or as AgI, AgBr or AgCl. Ammonium iodide, ammonium bromide or ammonium chloride salts are also useful. Mixtures of chlorides, bromides and iodides also give excellent results.

Excess iodide, bromide or chloride is preferred because it accelerates resolution of the silver deposit. This results in a faster display system. Excess halide may be added as quaternary ammonium salt, ammonium halide salt or alkali-metal salt. For convenience, the silver and halide is added as AgI, AgBr or AgCl and the excess halide is added as halide salt, (i.e., LiI, RbI, LiBr, $NH_4I$, etc.). Mixtures of AgI, AgBr, and AgCl, as well as mixtures of halide salts (i.e., LiI, LiBr) are used.

Concentration of silver salt may range from approximately 0.001 moles per mole of solvent to saturation. Below 0.001 moles silver salt per mole solvent, the voltage necessary to electrodeposit sufficient material for good display is excessive. The ammonium halide, alkali halide and quaternary salt concentration must be adequate to bring all of the silver halide into solution.

The concentration of the various additions employed may vary broadly as indicated above and for the iodides in the table below. The ranges are expressed in terms of moles/mole of solvent.

|  | Permitted Range | Operating Range | Best Range |
|---|---|---|---|
| AgI | 0.05–0.35 | 0.1–0.22 | 0.13–0.18 |
| $NH_4I$ | 0.015–0.10 | 0.025–0.06 | 0.03–0.05 |
| $NR_4I^-$ | 0.01–0.20 | 0.02–0.06 | 0.025–0.04 |
| Solvent | 1.00 | 1.00 | 1.00 |

Various substitutions can be made for the compounds listed above. For example, AgBr or AgCl or other silver complex compound that is soluble in the solvent (e.g., $RbAg_4I_5$) may be substituted for AgI. The corresponding bromide or chloride may be substituted for $NH_4I$ as well as alkali-metal iodides, bromides and chlorides. Any quaternary ammonium salt (iodide, bromide or chloride) may be used but a tetra-alkyl ammonium iodide is preferred as set forth above. Generally, chlorides are most useful where a silver back plate is used in the display device. Bromides are most useful when special color effects (for example, blue color displays) are desired. For the most part, iodides are preferred because of the low power requirements, high contrast, etc. Mixtures of iodides, bromides and chlorides are also useful.

Various solvents are useful as set forth above. The compositional limits set forth above are for a variety of solvents but particularly for N,N-dimethyl formamide. For dimethyl sulfoxide, the maximum concentrations can be increased by about 50 percent and for various esters that might be useful as solvents (e.g., diethylmalonate), the concentration range might be decreased by about 50 percent. It should be understood that the upper bound of concentration might be a saturated solution rather than the concentration set forth in the table. Also, the compositional limits refer to the liquid part of the electrolyte and various solid substances may be added to make a paste and/or to improve optical characteristics as set forth below.

Optionally, an opacifier may be added to the liquid part of the electrolyte to improve contrast ratio, lower power requirements and improve device reliability and lifetime. The opacifier may be all semiconductor particularly if particle size is small enough to keep particles dispersed. It may also be of two types of solid substances, one a semiconducting type substance and one an insulating type substance. The substances should be stable to the environment of the display device, particularly the driving voltage.

A large variety of substances may be used as the semiconducting substance including the doped counterpart of various insulating substances, such as $TiO_2$, $Ta_2O_5$, $Nb_2O_5$. Either p-type or n-type may be used. Preferably, the semiconducting substances should have conductivities of at least $10^{-9}$ mhos/cm under an applied voltage at room temperature. Higher conductivities are preferred because of more rapid switching of the display and greater contrast of the display. Typical higher conductivities are at least $10^{-8}$ mhos/cm or even at least $10^{-7}$ mhos/cm. Higher conductivities up to about one mhos/cm also can be very useful. Conductivities often vary with applied voltage perhaps due to surface charge states. Upon injection of electrons during the application of voltage, the semiconductor often becomes lightly colored, increasing its conductivity. This change is not observed in the silver containing display as deposition occurs at the same time. This color disappears on voltage reversal, leaving the background clear. The semiconducting substance should also preferably be white or light colored to provide maximum contrast with the electroplated substance making up the display. The semiconducting substance should be insoluble in the electrolyte and not be irreversibly affected by the conditions (voltage, electrode action, etc.) of the display device.

The insulating substance should preferably be white or light in color in order to provide maximum contrast with the substance plating out during operation of the display device. It should also be inert to the chemical and physical conditions of the display device, as described above, and preferably be sufficiently reflective to enhance the contrast for the display.

The concentration of semiconductor and insulator substances in the opacifier may vary over large limits and still provide excellent device performance. Preferred concentrations often depend on the properties of semiconductor used, the particular semiconductor substances used, and the properties and identity of insulator substance used. Preferred concentration ranges for typical semiconductor and insulator substances are 1 to 90 weight percent semiconductor remainder insulator. Better results are obtained using a concentration range from 20 to 70 weight percent semiconductor, remainder insulator, particularly for 4A molecular sieve and $Al_2O_3$ or mixtures of these two insulator substances. Best results are obtained using 30 to 40 weight percent semiconductor, remainder insulator substance.

Small particle size is also highly advantageous because of the increased dispersion of the deposits, its fineness and the resolution of the display. Particle sizes less than five microns are preferred. Generally, semiconductor substances and insulator substances have a range of particle sizes. For the display systems described here, it is preferred that the average particle size is less than five microns. Still smaller particle sizes are advantageous where obtainable in a suitable semiconductor or insulator substance. For example, for either semiconductor or insulator substance, average particle size less than one micron is preferred. Average particle size less than one tenth of a micron is even more preferred.

A large variety of materials may be used as the semiconducting substance including mixtures of various substances. High optical index of refraction is preferred because of greater reflecting characteristics which increase the optical contrast of the display device. Preferred are uncolored transition-metal oxides such as $TiO_2$, $ZrO_2$, $Nb_2O_5$ and other compounds containing Ti, Zr, Nb and Ta. Transition metals are metals with partially filled d shells. These substances should contain impurities or dopants to make them semiconducting. The selection of impurity depends on the basic substance chosen. For example, the valence of the impurity or dopant cation should either be less than (for p-type semiconductor) or greater than (for n-type semiconductor) the cation of the basic substance. Also, the ionic radius of the impurity cation should be approximately the same as the cation of the basic substance.

Some of cations suitable for impurity doping in basic substances are given in the table below for six coordination environments:

| Cation | $M^{2+}$ | Be | Ni | Mg | Zn | Fe | | | | |
|---|---|---|---|---|---|---|---|---|---|---|
| Radius | | .45 | .69 | .72 | .74 | .78 | | | | |
| Cation | $M^{3+}$ | Al | As | Ni | Co | Cr | Fe | Mn | Sc | Sb | In |
| Radius | r | .535 | .58 | .60 | .61 | .615 | .645 | .645 | .745 | .76 | .80 |
| Cation | $M^{4+}$ | Si | Ti | Ge | Zr | Sn | Hf | | | | |
| Radius | r | .40 | .605 | .53 | .72 | .69 | .71 | | | | |
| Cation | $M^{5+}$ | P | V | As | Nb | Sb | Ta | | | | |
| Radius | r | .38 | .54 | .46 | .64 | .60 | .64 | | | | |
| Cation | $M^{6+}$ | Mo | W | | | | | | | | |
| Radius | r | .59 | .60 | | | | | | | | |
| Cation | $M^{7+}$ | Re | | | | | | | | | |
| Radius | r | .53 | | | | | | | | | |

Although the impurity concentration in the semiconductor substance may vary over large limits, particularly good results are obtained in the range of 0.001 to 1.0 weight percent. For typical semiconductors, best results are obtained in the range from 0.005 to 0.025 weight percent.

A particular good and low cost semiconductor material is reagent grade $TiO_2$. This grade $TiO_2$ has sufficient impurities to make it semiconducting. Various impurities may be used as described above. A particularly effective impurity for $TiO_2$ is iron in the concentration range of 0.005 to 0.025 weight percent.

Various insulating substances may be used provided they are insoluble and inert to the conditions of the display device. Again, high reflectivity and white or light color is desirable to increase light reflection and insure good optical contrast. Typical insulating substances are BeO, MgO, ZnO, $Al_2O_3$, $Ga_2O_3$, $Sc_2O_3$, $Y_2O_3$, $La_2O_3$, $Gd_2O_3$, $SiO_2$, $GeO_2$, and mixed oxide compounds of the above such as $BeAl_2O_4$, $ZnGa_2O_4$, $MgAl_2O_4 Be_3Al_2Si_3O_{12}$, $GdAlO_3$, etc. Also useful are insoluble mixed-oxide compounds containing alkali-metal ions. Typical examples are $NaAlSi_2O_6$ and $NaYO_2$. Transition-metal oxides may also be used provided they are insoluble and do not contain impurities which make them semiconducting. Typical examples are $TiO_2$, $BaTiO_3$, $ZrO_2$ $KTaO_3$, etc.

Particularly good results are obtained by the use of alkali-metal alumino silicates (zeolites commercially known as molecular sieves) because of small particle size. Such substances are readily available and inexpensive. These substances may offer other advantages such as absorption of water inadvertently entering the display device and absorption of gas products. These properties increase device lifetime. The compound $NaAlSi_2O_8$ (commercially known as 4A molecular seive) is preferred because of extremely small particle size and easy availability. Mixtures of compounds are often useful as the insulator substance. A typical example is $NaAlSi_2O_8$ and $Al_2O_3$. For $TiO_2$ as the semiconductor substance and $NaAlSi_2O_8$ as the insulator substance, a concentration range from 30 to 70 weight percent semiconductor remainder insulating substance shows excellent results.

Useful opacifier compositions are as follows:
a. 1 gm $TiO_2$—2 gm 4A molecular sieve.
b. 1 gm $TiO_2$—1 gm 4A seive—1 gm $Al_2O_3$.
c. 1 gm $TiO_2$—1 gm 4A sieve—4 gm $Al_2O_3$.
d. 1 gm $TiO_2$—2 gm $Al_2O_3$.

The reference cell may vary in structure depending on application and use. Generally, the reference cell consists of two transparent substrates (e.g., glass or plastic), which enclose a volume containing the active medium, often in the form of a paste. Electrical contact with the active medium may be provided in a variety of ways, including transparent contacts (e.g., indium-tin oxide, $InO_2$, etc.) mounted on the inside (side facing and in contact with the active medium) of the transparent substrates. Polarity is arranged so that electrodeposition occurs on the front face. The conducting material may be put down on the transparent substrates in predetermined shapes so as to form numbers, letters, etc. Various geometric shapes for producing figures, letters, numbers, etc. may also be used. A typical example is the seven segment alpha numeric display extensively used in display devices as calculators, watches, etc.

The invention is conveniently illustrated by a description of the figure. The figure shows an electrodeposition display device, 10, made in accordance with the invention. It comprises a lower transparent glass substrate, 11, a lower transparent electrical contact, 12, made of indium-tin oxide and an electrical connection, 13, to the lower transparent electrical contact, 12. Spacers, 15, are used to offset the lower transparent glass substrate, 11, from the upper transparent glass substrate, 18, and seals, 14, and 16 are used to prevent leakage of the active material out of the cavity 20. In this particular device, the seals are made of wax paper. The inner surface of the upper transparent glass substrate, 18, also contains a transparent electrical conductor, 17, and electrical contact, 19. The cavity contains the active material with suitable organic solvent, source of silver ions, quaternary ammonium halide.

We claim:
1. An electrodeposition display comprising:
  (a) positive and negative electrodes;
  (b) electrolyte comprising organic solvent, silver-containing ionic species and ionic species containing at least one element selected from the group consisting of iodine, bromine and chlorine in which electrical activation of the positive and negative electrodes produces an electrical action which leads to electrodeposition of a partially opaque silver species thereby altering the optical contrast of the display; CHARACTERIZED IN THAT the electrolyte comprises substituted ammonium halide selected from the group consisting of substituted ammonium iodide, substituted ammonium bromide and substituted ammonium chloride.

2. The electrodeposition display device of claim 1 in which the substituted ammonium halide is a substituted ammonium iodide.

3. The electrodeposition display device of claim 2 in which at least one R group in the formula $R_4N^+I^-$ for substituted ammonium iodide has at least one carbon atom and each of the R groups have up to 20 carbon atoms.

4. The electrodeposition display device of claim 3 in which the R groups have between 3 and 8 carbon atoms.

5. The electrodeposition device of claim 1 in which the solvent has a pKa greater than 9.

6. The electrodeposition device of claim 5 in which the solvent has a pKa value greater than 12.

7. The electrodeposition device of claim 1 in which the solvent is selected from the group consisting of dimethylsulfoxide and N,N-dimethylformamide.

8. The electrodeposition display device of claim 1 in which silver-containing ionic species is a silver halide compound in which the halide is selected from the group consisting of iodide and bromide.

9. The electrodeposition display device of claim 1 in which the electrolyte comprises in mole ratios AgI, 0.05 to 0.35 moles; NH$_4$I, 0.015 to 0.10 moles; tetrabutyl ammonium iodide, 0.01 to 0.20 moles, solvent, 1.00 moles.

10. The electrodeposition display device of claim 9 in which the electrolyte comprises in mole ratios AgI, 0.1 to 0.22 moles; NH$_4$I, 0.025 to 0.06 moles; tetrabutyl ammonium iodide, 0.02 to 0.06 moles; and solvent, 1.00 moles.

11. The electrodeposition display device of claim 10 in which the electrolyte comprises in mole ratios AgI, 0.13 to 0.18 moles; NH$_4$I, 0.03 to 0.05 moles; tetrabutylammonium iodide, 0.025 to 0.04; and solvent, 1.00 moles.

12. The electrodeposition display device of claim 11 in which the solvent comprises N,N-dimethylformamide.

13. The electrodeposition display device of claim 1 in which the electrolyte comprises in addition, an opacifier, comprising solid semiconducting substance.

14. The electrodeposition display device of claim 13 in which the opacifier comprises solid semiconductor substances and solid insulator substance.

15. The electrodeposition display device of claim 14 in which the semiconducting substance has a conductivity of at least $10^{-9}$ mhos/cm at room temperature.

16. The electrodeposition display device of claim 15 in which the opacifier comprises 1–90 weight percent solid semiconductor substance, remainder solid insulator substance.

17. The electrodeposition display device of claim 16 in which the opacifier comprises 20–70 weight percent solid semiconductor substance remainder solid insulator substance.

18. The electrodeposition display device of claim 17 in which the opacifier consists essentially of 30–40 weight percent solid semiconductor substance, remainder solid insulator substance.

19. The electrodeposition display device of claim 14 in which the solid semiconductor substance consists essentially of at least one suitably doped compound selected from the group consisting of uncolored, transition metal oxides in which said doping is yield a conductivity at room temperature of at least $10^{-9}$ mhos/cm.

20. The electrodeposition display device of claim 19 in which the solid semiconducting substance consists essentially of at least one suitably doped compound selected from the group consisting of $TiO_2$, $ZrO_2$, $Nb_2O_5$ and $Ta_2O_5$.

21. The electrodeposition display device of claim 19 in which the dopant concentration ranges from 0.001 to 1.0 weight percent.

22. The electrodeposition display device of claim 19 in which the semiconductor material is semiconducting $TiO_2$.

23. The electrodeposition display device of claim 22 in which the dopant is iron in the concentration range of 0.005 to 0.025 weight percent.

24. The electrodeposition display device of claim 14 in which the insulating substance is selected from the group consisting of BeO, MgO, ZnO, $Al_2O_3$, $Ga_2O_3$, $Sc_2O_3$, $Y_2O_3$, $La_2O_3$, $Gd_2O_3$, $SiO_2$, $GeO_2$, $BeAl_2O_4$, $ZnGa_2O_4$, $BeAl_2O_4$, $ZnGa_2O_4$, $MgAl_2O_4$, $Be_3Al_2Si_3O_{12}$, $GdAlO_3$, $NaAlSi_2O_6$ and $NaYO_2$.

25. The electrodeposition display device of claim 24 in which the insulator substance consists essentially of a transition metal oxide sufficiently pure to be insulating.

26. The electrodeposition device of claim 25 in which the insulating substance is selected from the group consisting of $NaAlSi_2O_8$ and $Al_2O_3$.

* * * * *